(12) United States Patent
Nakahara

(10) Patent No.: US 6,961,059 B2
(45) Date of Patent: Nov. 1, 2005

(54) GRAPHICS DRAWING DEVICE

(75) Inventor: Makoto Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 10/375,014

(22) Filed: Feb. 28, 2003

(65) Prior Publication Data
US 2003/0184554 A1  Oct. 2, 2003

(30) Foreign Application Priority Data
Mar. 27, 2002  (JP) .............................. 2002-088002

(51) Int. Cl.⁷ ............................................. G06T 11/20
(52) U.S. Cl. ..................... 345/440; 345/441; 345/536; 345/629
(58) Field of Search ................................. 345/440–443, 345/421–422, 629, 467–470, 530–531, 536

(56) References Cited

U.S. PATENT DOCUMENTS

| | | | | |
|---|---|---|---|---|
| 5,016,001 A | * | 5/1991 | Minagawa et al. | 345/442 |
| 5,088,050 A | * | 2/1992 | Ito | 345/442 |
| 5,133,049 A | * | 7/1992 | Cain et al. | 345/619 |
| 5,386,502 A | * | 1/1995 | Minagawa et al. | 345/441 |
| 5,390,291 A | * | 2/1995 | Ohashi | 345/419 |
| 6,069,633 A | * | 5/2000 | Apparao et al. | 345/421 |
| 6,151,026 A | * | 11/2000 | Iwade et al. | 345/420 |
| 6,522,328 B1 | * | 2/2003 | Asente | 345/441 |

* cited by examiner

*Primary Examiner*—Matthew C. Bella
*Assistant Examiner*—Po-Wei (Dennis) Chen
(74) *Attorney, Agent, or Firm*—Staas & Halsey LLP

(57) ABSTRACT

A graphics drawing device capable of reducing the amount of information transferred. In the graphics drawing device for drawing graphics, a first storage circuit stores coordinate information and attribute information about a main graphic which is an original graphic. A second storage circuit stores coordinate information and attribute information about one or two or more derivative graphics derived from the main graphic. A drawing circuit draws the main and derivative graphics in accordance with the information stored in the first and second storage circuits, and a control circuit controls the drawing process performed by the drawing circuit.

21 Claims, 15 Drawing Sheets

(X1, Y1, Z0, W0, W)   (X1, Y1, Z1, W1, B)

(X2, Y2, Z0, W0, W)   (X2, Y2, Z1, W1, B)

| FIRST EXAMPLE OF DATA TRANSFER | SECOND EXAMPLE OF DATA TRANSFER | DATA TRANSFER ACCORDING TO INVENTION |
|---|---|---|
| LINE SEGMENT DRAW COMMAND (1) | LINE SEGMENT DRAW COMMAND (1) | LINE SEGMENT DRAW COMMAND N1 |
| START/END POINT COORDINATES (1) | START/END POINT COORDINATES (1) | START/END POINT COORDINATES (1) |
| LINE SEGMENT DRAW COMMAND (5) | LINE SEGMENT DRAW COMMAND (5) | LINE SEGMENT DRAW COMMAND N2 |
| START/END POINT COORDINATES (5) | LINE SEGMENT DRAW COMMAND (2) | START/END POINT COORDINATES (2) |
| LINE SEGMENT DRAW COMMAND (2) | START/END POINT COORDINATES (2) | |
| START/END POINT COORDINATES (2) | LINE SEGMENT DRAW COMMAND (6) | |
| LINE SEGMENT DRAW COMMAND (6) | | |
| START/END POINT COORDINATES (6) | | |

FIG. 9

GRAPHICS DRAWING DEVICE

CROSS-REFERENCE TO RELATED APPLICATIONS

This application is based upon and claims priority of Japanese Patent Application No. 2002-88002, filed on Mar. 27, 2002, the contents being incorporated herein by reference.

BACKGROUND OF THE INVENTION

1. Field of the Invention

The present invention relates to a graphics drawing device, and more particularly, to a graphics drawing device for drawing a main graphic and a derivative graphic derived therefrom.

2. Description of the Related Art

In a graphics drawing device such as a car navigation system, information stored in a CD-ROM (Compact Disk Read Only Memory), a DVD (Digital Versatile Disk) or the like needs to be read out so that graphics may be drawn and displayed on screen.

There are generally two drawing methods for generating an image (image of a crossing with an underpass) as shown in FIG. 13, for example. The first method is to draw white line segments and black line segments in the order mentioned below. To explain the method with reference to the numerals shown in FIG. 14, first, black line segments (8), (7) and (6) are drawn, and then a white line segment (4) with a smaller width is drawn on the black line segment. Further, a black line segment (5) and then white line segments (3), (2) and (1) are drawn, whereupon the drawing is completed.

FIG. 15 shows an image obtained in the case where the line segments are drawn in order of (8), (4), (7), (3), (6), (2), (5) and (1). Thus, with the first method, if the line segments are drawn in different order, the desired image shown in FIG. 13 cannot be obtained.

The other method is to automatically set the drawing order based on information about the depth direction of graphics (in this instance, line segments) to be drawn by the graphics drawing device. With this method, it is unnecessary to take the drawing order into account, unlike the aforementioned method.

In the former drawing method, the drawing order must be determined in advance. A problem therefore arises in that an additional load is imposed on a device (e.g., a CPU (Central Processing Unit)) other than the graphics drawing device.

In the latter method, on the other hand, the load on the other processing device does not increase, but information indicating the depth direction of graphics also needs to be supplied to the graphics drawing device, giving rise to a problem that the amount of information transferred from the CPU to the graphics drawing device increases.

SUMMARY OF THE INVENTION

The present invention was created in view of the above circumstances, and an object thereof is to provide a graphics drawing device capable of reducing the amount of data transferred thereto from a CPU.

To achieve the object, there is provided a graphics drawing device for drawing graphics. The graphics drawing device comprises a first storage circuit for storing coordinate information and attribute information about a main graphic which is an original graphic, a second storage circuit for storing coordinate information and attribute information about one or two or more derivative graphics derived from the main graphic, a drawing circuit for drawing the main and derivative graphics in accordance with the information stored in the first and second storage circuits, and a control circuit for controlling a drawing process performed by the drawing circuit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a chart illustrating, for the purpose of comparison, examples of what information is transferred from a CPU to the graphics drawing device according to conventional methods and the present invention when part of graphics shown in FIG. 13 are to be drawn;

DESCRIPTION OF THE PREFERRED EMBODIMENTS

Figure 1:
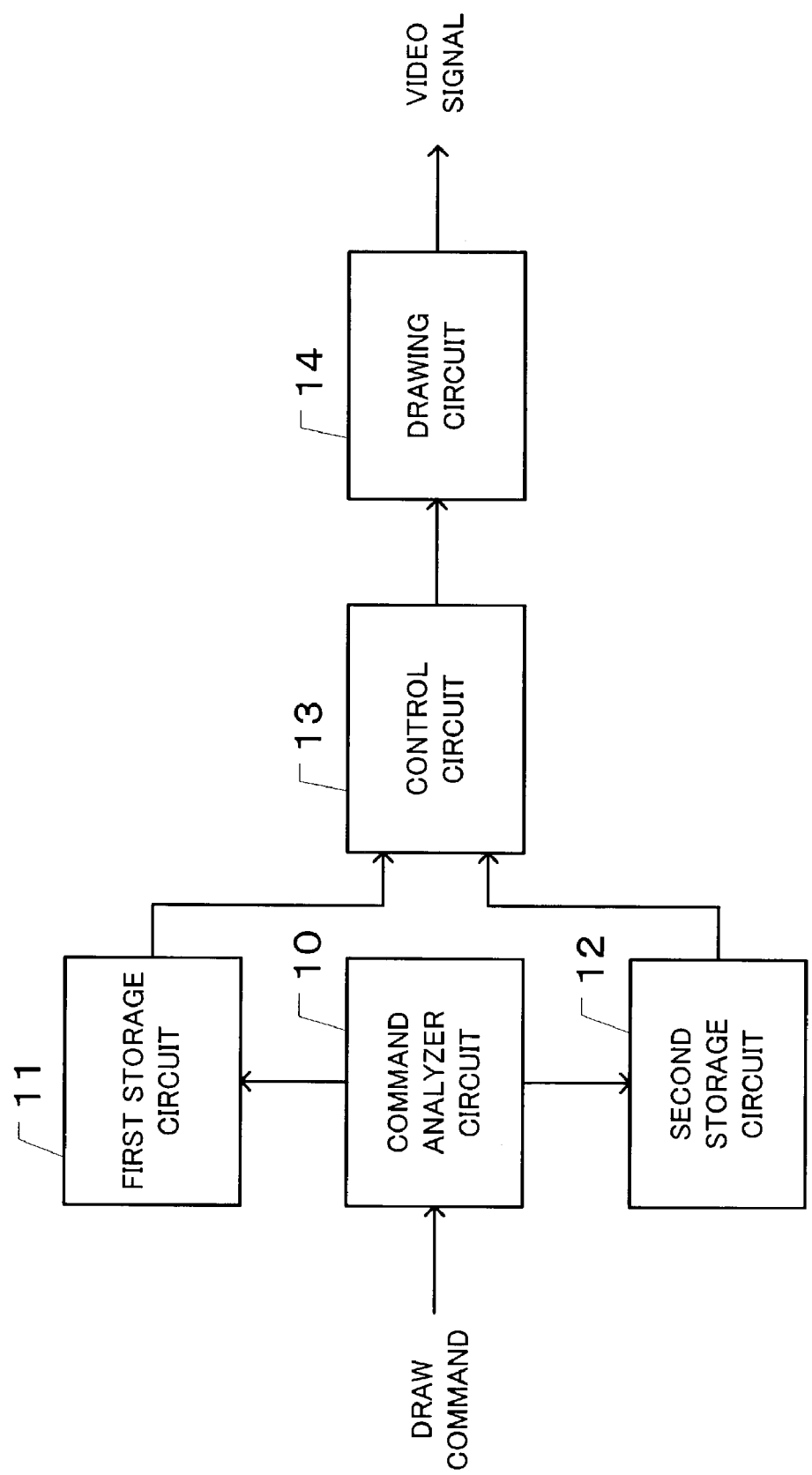
FIG. 1 is a diagram illustrating the principle of operation according to the present invention.

Embodiments of the present invention will be hereinafter described with reference to the drawings. FIG. 1 illustrates the principle of operation according to the present invention. As shown in FIG. 1, a graphics drawing device of the present invention comprises a command analyzer circuit 10, a first storage circuit 11, a second storage circuit 12, a control circuit 13, and a drawing circuit 14.

The command analyzer circuit 10 receives a draw command supplied from a CPU, not shown, then analyzes the command to generate coordinate information and attribute information about each of a main graphic (hereinafter referred to as main primitive), which is an original graphic, and a derivative graphic (hereinafter referred to as derivative primitive), and stores the generated information in the first and second storage circuits 11 and 12.

The first storage circuit 11 stores the coordinate and attribute information about the main primitive.

The second storage circuit 12 stores the attribute information about one or two or more derivative primitives derived from the main primitive.

The control circuit 13 controls the drawing process performed by the drawing circuit 14.

The drawing circuit 14 draws the main and derivative primitives in accordance with the information stored in the first and second storage circuits 11 and 12.

Operation in accordance with the principle illustrated in FIG. 1 will be now described.

Referring to FIG. 2, a process for drawing line segments will be explained.

Figure 13:
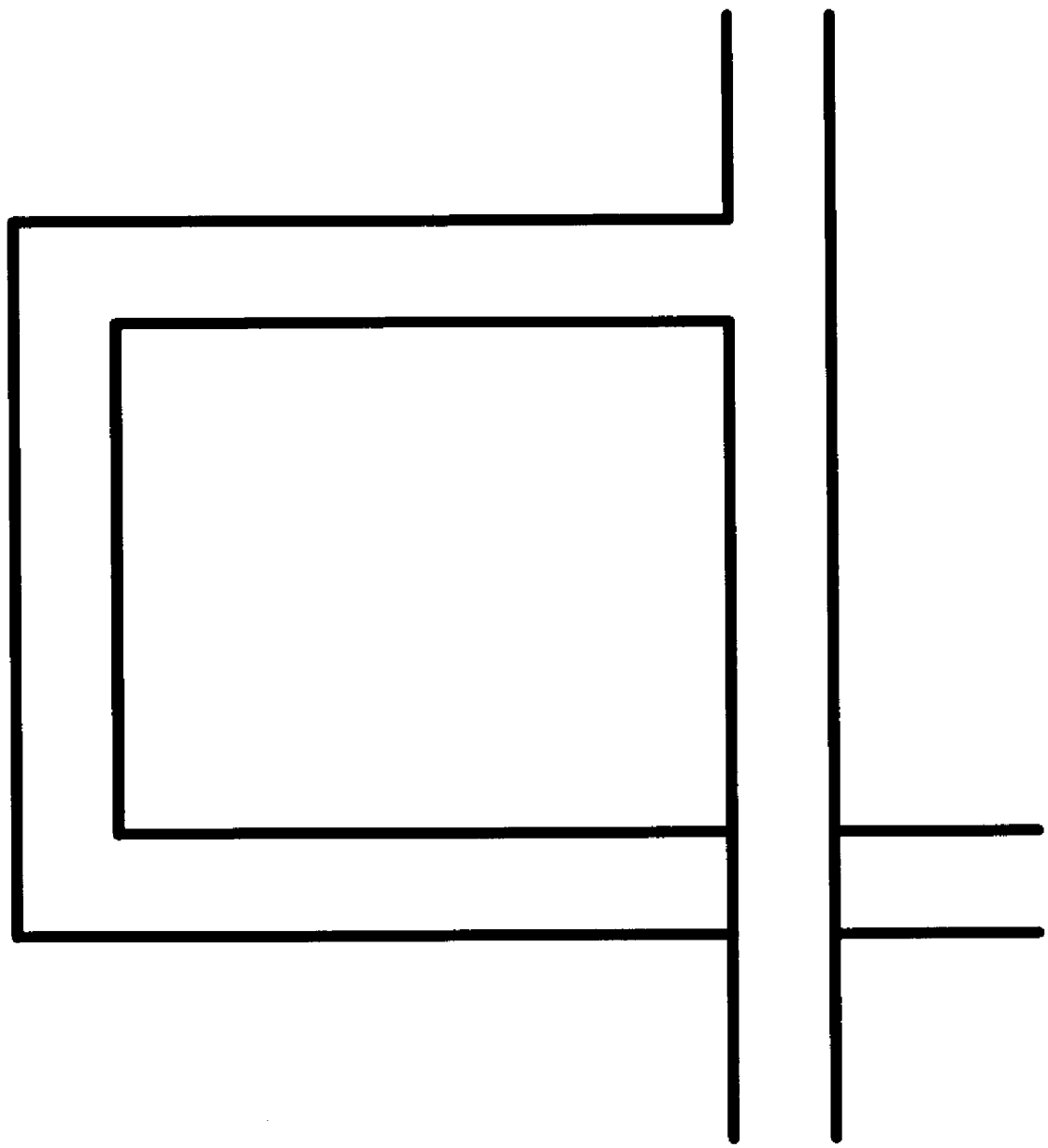
FIG. 13 is a diagram showing exemplary graphics drawn by the graphics drawing device.

If there arises a need in the CPU, not shown, to draw the graphics (crossing with an underpass) shown in FIG. 13, for example, the CPU determines coordinates of start and end points and widths (thicknesses) of individual line segments (geometric figures indicating roads) constituting the graphics to be drawn, and then supplies the results to the command analyzer circuit 10, together with a command requesting drawing of the line segments.

More specifically, coordinates (X1, Y1, Z0) and (X2, Y2, Z0) of two points of a road to be drawn and a width W0 of the main primitive are determined, for example, and information including the determined values is supplied to the command analyzer circuit 10 along with a command requesting drawing of the graphics indicating the road.

The command analyzer circuit 10 analyzes the draw command supplied from the CPU and, on recognizing that a request to draw the graphics indicating the road has been received, generates information about the main and derivative primitives based on the information supplied thereto.

Figure 2A:
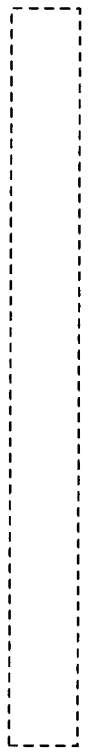
FIGS. 2(A), 2(B) and 2(C) are diagrams illustrating a process for drawing line segments.
Figure 2B:

Specifically, the command analyzer circuit 10 generates coordinate information and attribute information for drawing a white line segment (line segment enclosed by the broken line), shown in FIG. 2(A), as the main primitive and a black line segment, shown in FIG. 2(B), as the derivative primitive. As for the main primitive, start-point coordinates (X1, Y1, Z0) and end-point coordinates (X2, Y2, Z0) are generated as the coordinate information, and line width W0 and color W (=WHITE) are generated as the attribute information, the generated information being stored in the first storage circuit 11.

For the derivative primitive, on the other hand, start-point coordinates (X1, Y1, Z1) and end-point coordinates (X2, Y2, Z1) are generated as the coordinate information, and line width W1 (>W0) and color B (= BLACK) are generated as the attribute information, the generated information being stored in the second storage circuit 12. Each of Z0 and Z1 represents a coordinate in the depth direction of the image, and the value thereof increases with increasing depth of the image. In this instance, Z0<Z1, and accordingly, the main primitive is located in the foreground.

The control circuit 13 first acquires the coordinate information about the depth direction from the first and second storage circuits 11 and 12, and draws, first of all, the primitive which is located in the foreground. In this instance, since Z0<Z1, the main primitive is drawn first.

Then, the control circuit 13 acquires the coordinate and attribute information on the main primitive from the first storage circuit 11, and supplies the acquired information to the drawing circuit 14 to cause the same to draw the line segment shown in FIG. 2(A). As a result, a line segment is drawn which has the start-point coordinates (X1, Y1), end-point coordinates (X2, Y2), width W0, and color W.

Subsequently, the control circuit 13 acquires the coordinate and attribute information on the derivative primitive stored in the second storage circuit 12, and supplies the acquired information to the drawing circuit 14 to cause the same to draw the line segment shown in FIG. 2(B). As a result, a line segment which has the start-point coordinates (X1, Y1), end-point coordinates (X2, Y2), width W1 and color B is drawn so as to overlap the line segment shown in FIG. 2(A). In this case, drawing of that part of the derivative primitive which coincides with the main primitive is omitted, and only those parts of the derivative primitive which jut out from the main primitive are drawn.

Figure 2C:
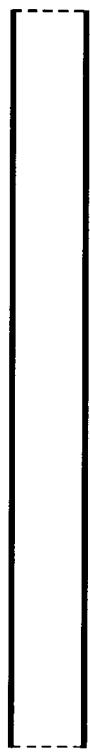

As a result, the intended line segment (line segment indicating a road) as shown in FIG. 2(C) is obtained.

Then, if it is necessary to draw next a line segment starting from the end point, the CPU generates a command for drawing a new line segment having its start point coinciding with the end point of the line segment drawn immediately before, and supplies the generated command to the command analyzer circuit 10.

Specifically, the CPU generates a command requesting drawing of a line segment starting from the end point (X2, Y2, Z0) of the previously drawn line segment and ending at point (X3, Y3, Z0), and supplies the command to the command analyzer circuit 10. At this time, transfer of the start-point coordinate information (X2, Y2, Z0) and information W0 indicating the width of the line segment may be omitted.

The command analyzer circuit 10, which is thus supplied with the command from the CPU, recognizes that the received command requests drawing of a new line segment based on the previously drawn line segment. Then, the command analyzer circuit 10 writes the end-point coordinates (X3, Y3, Z0) of the new line segment into the first storage circuit 11 as the start-point coordinates, while at the same time leaves the other previously written information unchanged, that is, no modification is made to the end-point coordinates (X2, Y2, Z0), line width W0, and line color W.

Similarly, the command analyzer circuit 10 writes the end-point coordinates (X3, Y3, Z0) of the new line segment into the second storage circuit 12 as the start-point coordinates, while at the same time leaves the other previously written information unchanged, that is, no modification is made to the end-point coordinates (X2, Y2, Z0), line width W1, and line color B.

Then, the control circuit 13 acquires the coordinate information on the depth direction of the main and derivative primitives and determines which primitive should be drawn first, in the same manner as in the aforementioned case. In this instance, Z0<Z1, and accordingly, the main primitive is drawn first.

Subsequently, the control circuit 13 acquires the coordinate and attribute information on the main primitive from the first storage circuit 11, and supplies the acquired information to the drawing circuit 14 to cause the same to draw the line segment. As a result, a line segment is drawn which has the start-point coordinates (X3, Y3), end-point coordinates (X2, Y2), width W0, and color W.

Further, the control circuit 13 acquires the coordinate and attribute information on the derivative primitive stored in the second storage circuit 12, and supplies the acquired information to the drawing circuit 14 to cause the same to draw the line segment. As a result, a line segment which has the start-point coordinates (X3, Y3), end-point coordinates (X2, Y2), width W1 and color B is drawn so as to overlap the main primitive.

A process similar to the above is repeated thereafter, so that the graphics shown in FIG. 13 can be drawn.

As described above, in the graphics drawing device according to the present invention, graphics to be drawn are recognized as separate main and derivative primitives. Information common to these primitives is omitted and only different information is input for drawing. It is therefore possible to reduce the amount of information transferred between the CPU and the graphics drawing device.

Also, since the graphics drawing device takes charge of the management of information about the depth direction, it is unnecessary for the CPU to supply the depth information, whereby the amount of information to be transferred can be reduced, as in the above case.

Further, in cases where there is information common to the previously drawn graphic and a graphic to be drawn next, the common information is utilized efficiently, thus making it possible to further reduce the amount of information to be transferred.

A first embodiment of the present invention will be now described.

Figure 3:
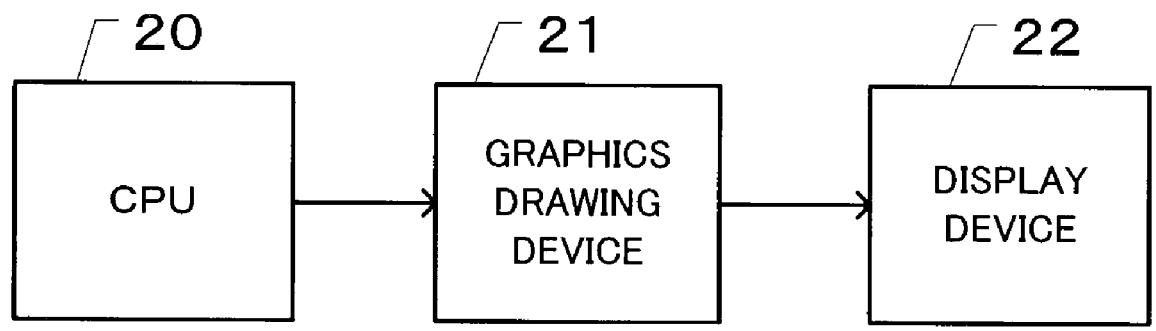
FIG. 3 is a diagram illustrating an exemplary configuration of a system including a graphics drawing device according to the present invention.

FIG. 3 illustrates an exemplary configuration according to the first embodiment of the present invention. As shown in FIG. 3, a graphics drawing device 21 of the present invention is interposed between a CPU 20 and a display device 22, performs a drawing process in accordance with a draw command supplied from the CPU 20, and supplies an image obtained to the display device 22 to be displayed thereby.

The CPU 20, which is provided in a personal computer or a car navigation system, for example, generates a draw command in accordance with a program stored in a storage device, not shown, and supplies the generated command to the graphics drawing device 21.

The graphics drawing device 21 performs a drawing process in accordance with the draw command supplied from the CPU 20, and supplies an image obtained to the display device 22 to be displayed thereby.

The display device 22 comprises, for example, an LCD (Liquid Crystal Display) and displays the image generated by the graphics drawing device 21.

Figure 4:
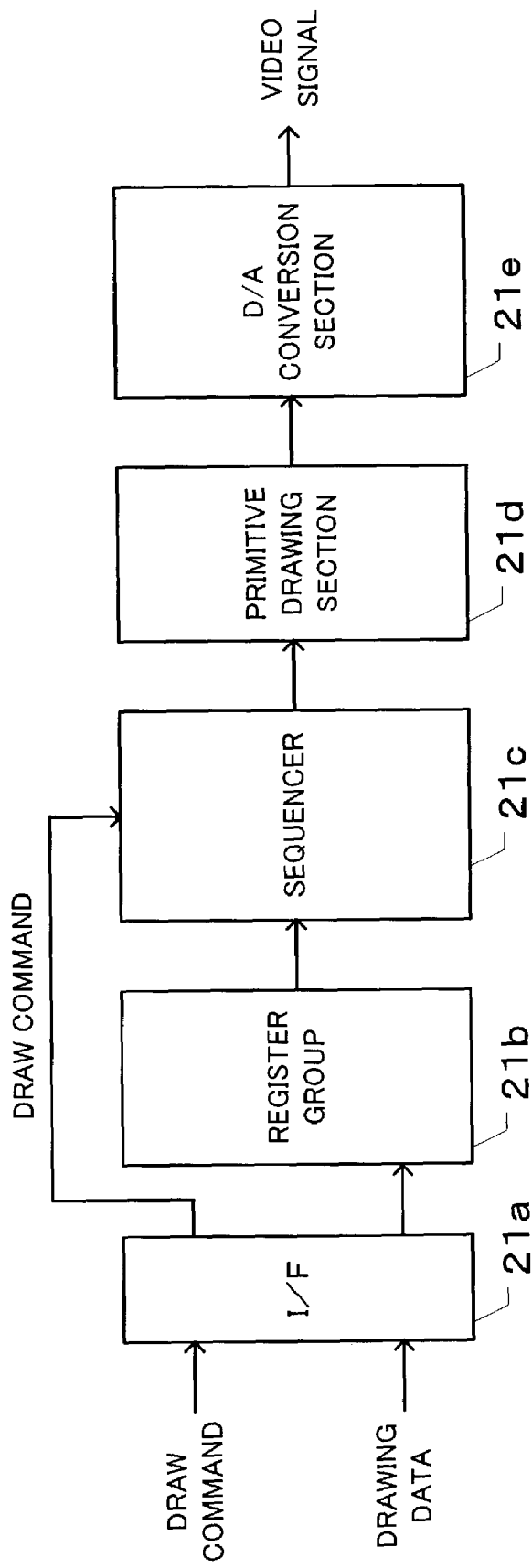
FIG. 4 is a diagram illustrating an exemplary configuration according to a first embodiment of the present invention.

FIG. 4 shows in detail an exemplary configuration of the graphics drawing device 21 appearing in FIG. 3. As shown in FIG. 4, the graphics drawing device 21 comprises an I/F (Interface) 21a, a register group 21b, a sequencer 21c, a primitive drawing section 21d, and a D/A (Digital-to-Analog) conversion section 21e.

The I/F 21a converts signal levels etc. of data when supplied with a draw command and drawing data (coordinate information, attribute information, etc.) from the CPU 20.

The register group 21b is constituted by a plurality of registers for storing the drawing data supplied from the CPU 20. Details of the register group 21b will be described later.

The sequencer 21c reads out the draw command and the drawing data in predetermined order from the register group 21b, and supplies the same to the primitive drawing section 21d for drawing.

The primitive drawing section 21d draws graphics (main and derivative primitives) in accordance with the draw command and drawing data supplied from the sequencer 21c, and supplies the graphics to the D/A conversion section 21e.

The D/A conversion section 21e converts the image signal (digital signal) supplied from the primitive drawing section 21d to an analog signal (video signal), and outputs the converted signal to the display device 22.

Figure 5:
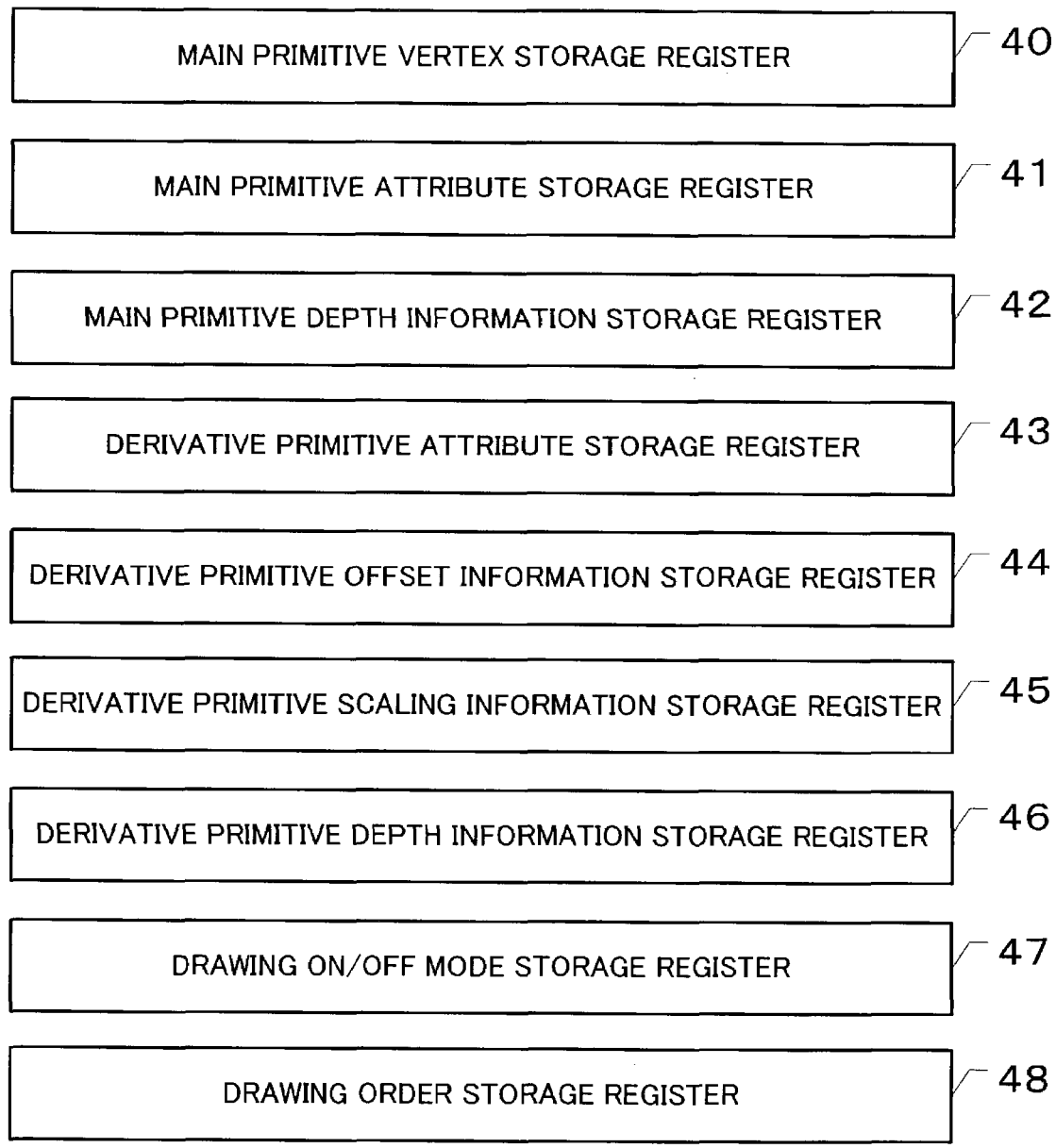
FIG. 5 is a diagram illustrating in detail an exemplary configuration of a register group appearing in FIG. 4.

FIG. 5 shows details of the register group 21b appearing in FIG. 4.

As shown in FIG. 5, the register group 21b includes a main primitive vertex storage register 40, a main primitive attribute storage register 41, a main primitive depth information storage register 42, a derivative primitive attribute storage register 43, a derivative primitive offset information storage register 44, a derivative primitive scaling information storage register 45, a derivative primitive depth information storage register 46, a drawing on/off mode storage register 47, and a drawing order storage register 48.

The main primitive vertex storage register 40 stores information about vertexes necessary for drawing the main primitive.

The main primitive attribute storage register 41 stores attribute information on the main primitive. The attribute information represents, for example, other processing information that affects the drawing results than the vertex information, such as depth comparison mode, blending mode, color information, width (thickness) information, etc.

The main primitive depth information storage register 42 stores information on the depth of the main primitive. The depth information indicates the relationship between the main primitive and individual derivative primitives in the depth direction (foreground or background) on the screen, and is treated herein as separate information from the vertex information for simplicity of explanation.

The derivative primitive attribute storage register 43 stores attribute information on each of derivative primitives 1 to n, for example, in the case where n derivative primitives are to be drawn. The attribute information represents, for example, other processing information that affects the drawing results than the vertex information, such as depth comparison mode, blending mode, color information, width information, etc.

The derivative primitive offset information storage register 44 stores offset information on each of the derivative primitives 1 to n associated with the main primitive. The offset information is information used when a derivative primitive is to be drawn with the vertex coordinates of the main primitive shifted by a predetermined amount, and is treated herein as separate information from the attribute information for simplicity of explanation.

The derivative primitive scaling information storage register 45 stores scaling information on each of the derivative primitives 1 to n associated with the main primitive. The scaling information is information used when the size of a derivative primitive to be drawn is different from that of the main primitive, and is treated herein as separate information from the attribute information for simplicity of explanation.

The derivative primitive depth information storage register 46 stores depth information of each of the derivative primitives 1 to n associated with the main primitive. The depth information indicates the relationship between the main primitive and the individual derivative primitives in the depth direction (foreground or background) on the screen, and is treated herein as separate information from the vertex information for simplicity of explanation.

The drawing on/off mode storage register 47 specifies whether or not the main primitive and the individual derivative primitives 1 to n should be drawn. The information in the register 47 can be set as desired such that, for example, the main primitive and a certain derivative primitive should not be drawn and that the remaining derivative primitives should be drawn.

The drawing order storage register 48 specifies the order of drawing the main primitive and the derivative primitives 1 to n. The drawing order can be set such that the primitives are drawn sequentially from the background toward the foreground, for example. The setting of the drawing order is useful in cases where a process of mixing colors, such as blending, is needed for the overlapping parts of the individual primitives.

Operation according to the first embodiment will be now described. In the following, the drawing operation will be explained taking the graphics shown in FIGS. 13 and 14 as an example.

The CPU 20 divides the graphics shown in FIG. 13 into main primitives and derivative primitives. In this instance, the line segments (1), (2), (3) and (4) are set as main primitives, while the line segments (5), (6), (7) and (8) are set as derivative primitives associated with the respective main primitives.

Subsequently, the CPU 20 sets depth values for determining the foreground/background relationships of these primitives. Specifically, provided the depth values of the line segments (1) to (8) are Z1 to Z8, respectively, suitable values satisfying the relationship $(Z1=Z2=Z3)<(Z5=Z6=Z7)<Z4<Z8$ are set as the respective depth values, on the precondition that a primitive with a smaller depth value should be located in the foreground.

The CPU 20 then generates a draw command. For the line segments (1) and (5) which are a main primitive and a derivative primitive associated therewith, for example, one draw command (draw command #1) and drawing data (drawing data #1) are generated. Specifically, the CPU generates, as the draw command #1, a command to draw a line segment, and generates, as the drawing data #1, vertex coordinates of the main primitive, display color of the main primitive, display color of the derivative primitive, depth information of the main primitive, depth information of the derivative primitive, information indicative of the order of drawing the main and derivative primitives, width information of the main primitive, and width information of the derivative primitive.

Similarly, draw commands #2 to #4 and drawing data #2 to #4 are generated for the line segments (2), (6), line segments (3), (7), and line segments (4), (8), respectively.

Subsequently, the CPU 20 supplies the draw command #1 and the drawing data #1 to the graphics drawing device 21.

The graphics drawing device 21, which is input with the information through the I/F 21a, supplies the draw command #1 to the sequencer 21c and the drawing data #1 to the corresponding registers of the register group 21b. Specifically, the vertex coordinates of the main primitive are stored in the main primitive vertex storage register 40. The attribute information of the main primitive is stored in the main primitive attribute storage register 41, and the depth information of the main primitive is stored in the main primitive depth information storage register 42. The attribute information of the derivative primitive is stored in the derivative primitive attribute storage register 43, and the depth information of the derivative primitive is stored in the derivative primitive depth information storage register 46. The information indicative of the drawing order is stored in the drawing order storage register 48. In this instance, the offset information, the scaling information and the drawing on/off mode setting information do not exist, and therefore, no information is set in the derivative primitive offset information storage register 44, the derivative primitive scaling information storage register 45 and the drawing on/off mode storage register 47.

On completion of the setting of the drawing data, the sequencer 21c looks up the drawing on/off mode storage register 47 to specify the primitive to be drawn. In this instance, no data is set in this register, which indicates that there is no primitive whose drawing mode is set off. Accordingly, the sequencer 21c recognizes that both of the main and derivative primitives need to be drawn.

Subsequently, the sequencer 21c looks up the drawing order storage register 48 to determine the drawing order. If the specified drawing order is such that the line segment (1) of the main primitive and the line segment (5) of the derivative primitive should be drawn in the order mentioned, for example, the sequencer 21c first acquires the vertex coordinates and attribute information, such as display color (white), line width, etc., of the main primitive from the main primitive vertex storage register 40 and the main primitive attribute storage register 41, and supplies the acquired information to the primitive drawing section 21d.

The primitive drawing section 21d draws the line segment (1) while looking up the main primitive information supplied from the sequencer 21c.

Then, the sequencer 21c acquires the attribute information from the derivative primitive attribute storage register 43. In this instance, the display color (black) and line width of the derivative primitive are acquired. For the derivative primitive, its vertex coordinates are determined based on the vertex coordinates of the main primitive such that the width of the line segment is greater by a given amount determined from the attribute information, the vertex coordinates thus determined being supplied to the primitive drawing section 21d. Also, the sequencer 21c acquires the depth value of the derivative primitive from the derivative primitive depth information storage register 46, and supplies the acquired value to the primitive drawing section 21d.

The primitive drawing section 21d draws the derivative primitive while looking up the information supplied from the sequencer 21c. At this time, since the depth value of the line segment (5) corresponding to the derivative primitive is greater than the depth value of the main primitive acquired from the main primitive depth information storage register 42, that part of the line segment (5) which coincides with the line segment (1) is not drawn and only those parts which jut out from the line segment (1) are drawn.

Subsequently, the CPU 20 supplies the draw command #2 and the drawing data #2 to the graphics drawing device 21.

The graphics drawing device 21 performs a process similar to the aforementioned process, so that the primitive drawing section 21d draws the line segment (2) corresponding to the main primitive and the line segment (6) corresponding to the derivative primitive. At this time, since the depth value of the line segment (2) is equal to that of the line segment (1) as mentioned above, that part of the line segment (2) which overlaps the line segment (1) is not drawn. On the other hand, the depth value of the line segment (2) is smaller than that of the line segment (5), and therefore, the line segment (2) is drawn in a manner superimposed on the line segment (5).

The CPU 20 then supplies the draw command #3 and the drawing data #3 to the graphics drawing device 21. As a result, a process similar to the aforementioned process is carried out to draw the line segments (3) and (7).

Finally, the CPU 20 supplies the draw command #4 and the drawing data #4 to the graphics drawing device 21. In this case, since the line segments (4) and (8) are greater in depth value than the line segments (1) and (5), those parts of the line segments (4) and (8) which overlap the line segments (1) and (5) are not drawn.

The image signal obtained by the aforementioned processing is supplied to the D/A conversion section 21e, where the image signal is converted to an analog signal (video signal) and then supplied to the display device 22. The display device 22 displays the video signal supplied thereto, and as a result, the image shown in FIG. 13 is displayed on the screen.

As described above, according to this embodiment of the present invention, graphics are disassembled into main and derivative primitives, and part of the drawing data and the draw command are shared among the primitives. Accordingly, compared with the conventional method in which a draw command and drawing data are separately generated for graphics to be drawn, it is possible to reduce the amount of data transferred from the CPU 20 to the graphics drawing device 21.

The width information of the derivative primitive may be generated by the sequencer 21c, instead of the CPU 20, based on the width information of the main primitive generated by the CPU 20.

Also, in the foregoing description of the embodiment, line segment (or rectangle) is taken as an example. Needless to say, the present invention is applicable to various other geometric figures, for example, triangle which is frequently used as a basic element in drawing graphics.

Further, in the above description, the main primitive vertex storage register 40, the main primitive attribute storage register 41, the main primitive depth information storage register 42, the derivative primitive attribute storage register 43, the derivative primitive depth information storage register 46 and the drawing order storage register 48 are used by way of example. The use of the other registers serves to optimize the drawing process.

For example, where the derivative primitive is shifted from the main primitive by a certain amount along the coordinate axes, such a shift amount may be set as an offset in the derivative primitive offset information storage register 44. By using the register 44, therefore, it is possible to draw the derivative primitive even in the case where the derivative primitive is shifted from the main primitive along the coordinate axes.

The drawing on/off mode storage register 47 permits the drawing mode of each of the main and derivative primitives to be set on or off. Accordingly, in cases where there are a plurality of derivative primitives, for example, the drawing modes of the individual derivative primitives can be set on or off as needed.

Figure 6:
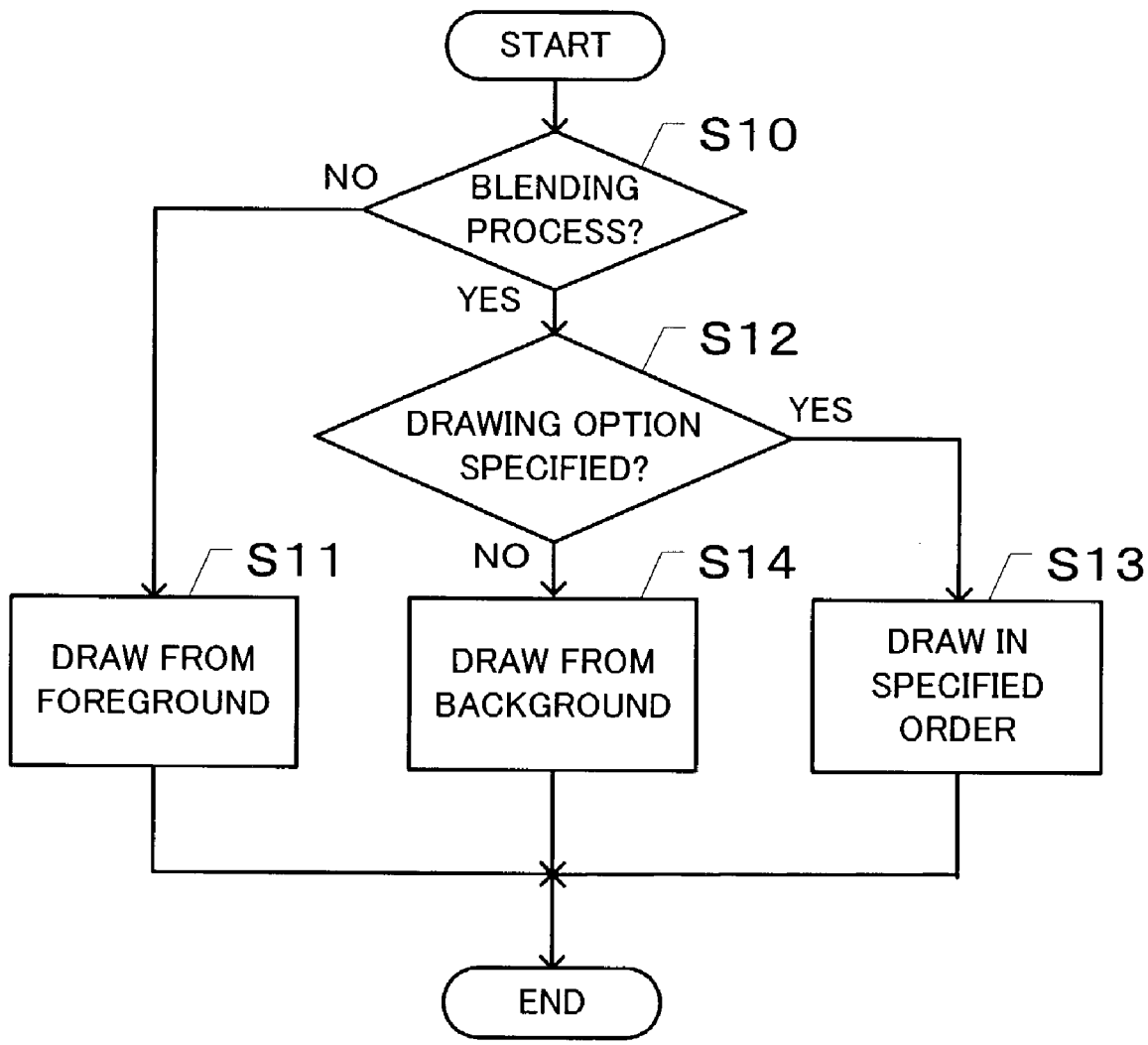
FIG. 6 is a flowchart illustrating the flow of a process for optimizing drawing order.

FIG. 6 is a flowchart illustrating the flow of a process for optimizing the drawing order. Upon start of the process shown in the flowchart, the following steps are executed.

Step S10:

The sequencer 21c looks up the draw command to determine whether or not the blending process is specified. If the blending process is specified, the flow proceeds to Step S12; if not, the flow proceeds to Step S11.

Step S11:

While looking up the depth information, the primitive drawing section 21d draws the main and derivative primitives from the foreground toward the background. Since the drawing of overlapping parts of the primitives is omitted, the drawing speed can be enhanced.

Step S12:

The sequencer 21c looks up the draw command to determine whether or not a drawing option is specified. If the drawing option is specified, the flow proceeds to Step S13; if not, the flow proceeds to Step S14. The drawing option is an option whereby the drawing order for the blending process can be specified as desired. Specifically, in the normal blending process, primitives are usually drawn from the background toward the foreground, and the drawing option is used to appropriately change the drawing order to thereby modify the blending method.

Step S13:

The primitive drawing section 21d draws the primitives in the order specified by the drawing option.

Step S14:

While looking up the depth information, the primitive drawing section 21d draws the primitives from the background toward the foreground.

In accordance with the above-described process, in cases where the blending is specified, the primitives are drawn in the specified order if the drawing option is specified, and are drawn from the background toward the foreground if the drawing option is not specified. Where the blending is not specified, the primitives are drawn from the foreground toward the background and the drawing of overlapping parts of the primitives is omitted, whereby the drawing speed can be improved.

Figure 7:
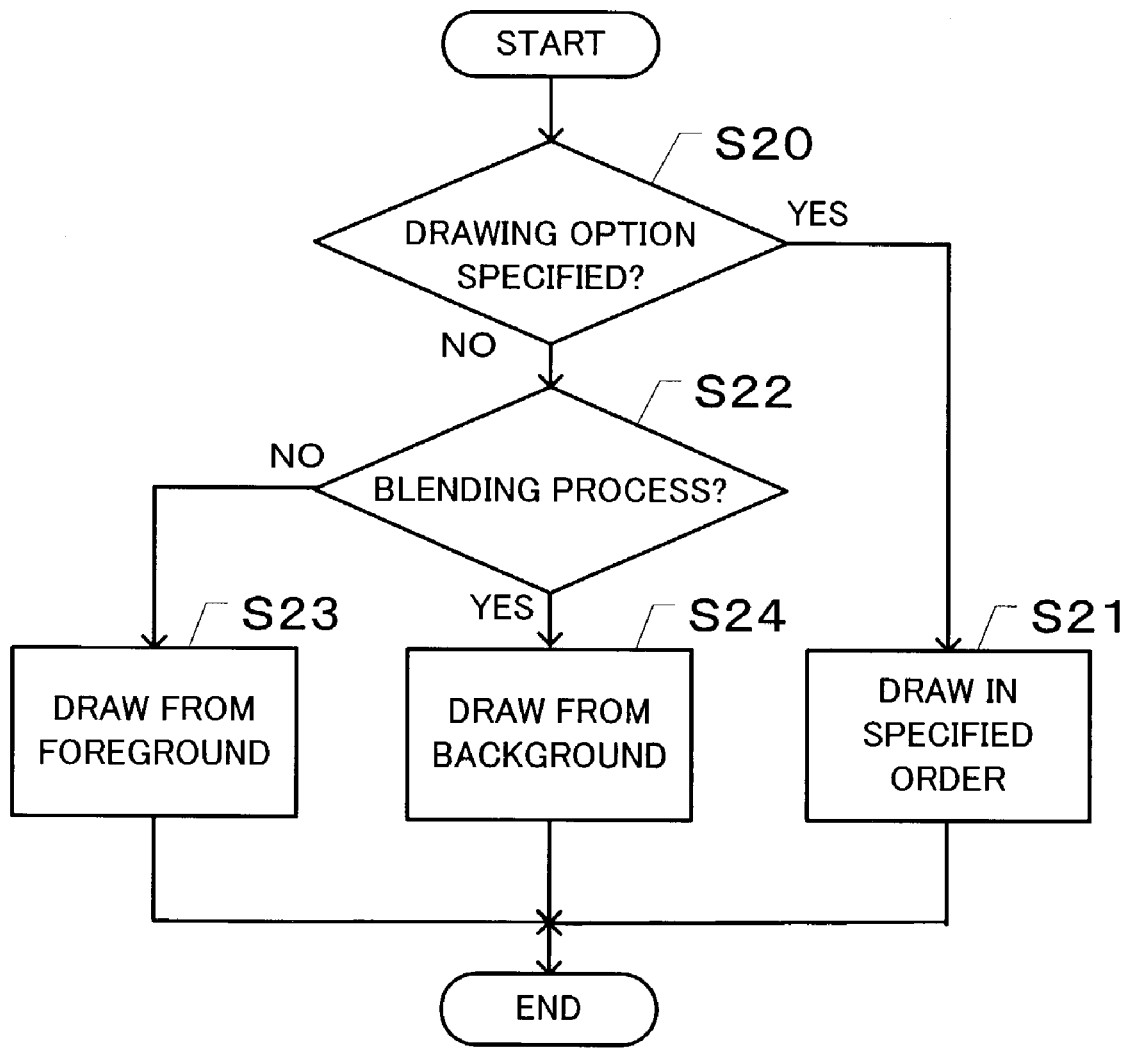
FIG. 7 is a flowchart illustrating the flow of another process for optimizing the drawing order.

FIG. 7 is a flowchart illustrating the flow of another process for optimizing the drawing order. Upon start of the process shown in the flowchart, the following steps are executed.

Step S20:

The sequencer 21c looks up the draw command to determine whether or not the drawing option is specified. If the drawing option is specified, the flow proceeds to Step S21; if not, the flow proceeds to Step S22. The drawing option denotes the same option as explained above.

Step S21:

The primitive drawing section 21d draws the primitives in the order specified by the drawing option.

Step S22:

The sequencer 21c looks up the draw command to determine whether or not the blending process is specified. If the blending is specified, the flow proceeds to Step S24; if not, the flow proceeds to Step S23.

Step S23:

While looking up the depth information, the primitive drawing section 21d draws the main and derivative primitives from the foreground toward the background. Since the drawing of overlapping parts of the primitives is omitted, the drawing speed can be improved.

Step S24:

While looking up the depth information, the primitive drawing section 21d draws the primitives from the background toward the foreground.

This process also provides the same advantages as obtained by the aforementioned process.

A second embodiment of the present invention will be now described.

Figure 8:
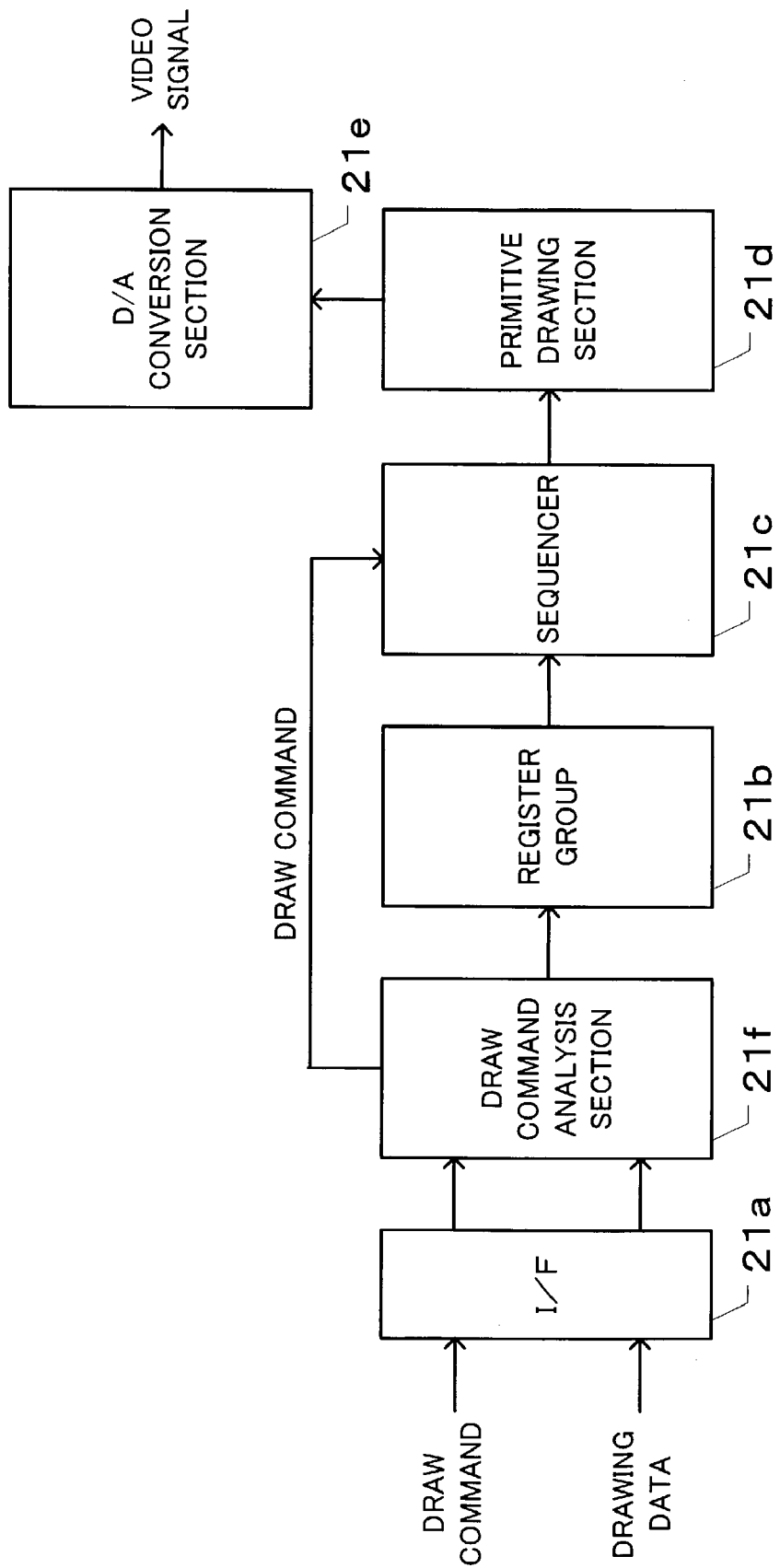
FIG. 8 is a diagram illustrating an exemplary configuration according to a second embodiment of the present invention.

FIG. 8 illustrates an exemplary configuration according to the second embodiment of the present invention. In FIG. 8, identical reference numerals are used to denote elements corresponding to those appearing in FIG. 4, and description of such elements is omitted. Compared with the embodiment shown in FIG. 4, the second embodiment is additionally provided with a draw command analysis section 21f. In other respects, the second embodiment is configured in the same manner as the embodiment shown in FIG. 4.

The draw command analysis section 21f analyzes the draw command supplied from the CPU 20 to generate drawing data for each of main and derivative primitives, and stores the generated data in the register group 21b.

Operation according to this embodiment will be now described.

In this embodiment, the CPU 20 supplies the graphics drawing device 21 with drawing data including the coordinate information about start and end points and the depth information, along with a draw command (referred to as "draw command DR" for convenience' sake) to draw a road, for example.

In the graphics drawing device 21, the draw command DR and the drawing data, which are input through the I/F 21a, are supplied to the draw command analysis section 21f.

On acquiring the input draw command DR, the draw command analysis section 21f recognizes that a request to draw a road has been received, and supplies the draw command to the sequencer 21c. Also, the draw command analysis section 21f looks up the drawing data to generate drawing data for drawing each of main and derivative primitives, and stores the generated data in the register group 21b.

Specifically, first, for the main primitive, data for drawing a white line segment having a depth value corresponding to the input depth information, connecting the start and end points and having a predetermined width is generated, and information about the line color, line width, etc. is stored in the main primitive vertex storage register 40 and the main primitive attribute storage register 41.

Also, data for drawing a black line segment connecting the start and end points, having a width greater by a predetermined amount than that of the main primitive and having a greater depth value than the main primitive is generated, and information about the line color, line width, etc. is stored in the derivative primitive attribute storage register 43.

On completion of the generation of the drawing data, the sequencer 21c instructs the primitive drawing section 21d to start the drawing process. As a result, the main primitive is drawn first, and then the derivative primitive is drawn. At this time, the drawing of that part of the derivative primitive which overlaps the main primitive is omitted, whereby the drawing process can be performed quickly.

As for the information on the line colors and line widths of the main and derivative primitives, the combinations of the line colors and widths can be set beforehand. Also, the line width of the main primitive may be supplied from the CPU 20 as the drawing data, while the line width of the derivative primitive may be generated based on the line width of the main primitive.

As described above, in the second embodiment of the present invention, the graphics drawing device 21 is provided with the draw command analysis section 21f, and when graphics indicating a road, for example, are to be drawn, only the coordinates of the start and end points and the depth information need to be supplied, because the draw command analysis section 21f interprets the draw command and automatically generates drawing data for the main and derivative primitives. Compared with the first embodiment, therefore, the amount of information transferred from the CPU 20 to the graphics drawing device 21 can be further reduced.

Figure 14:
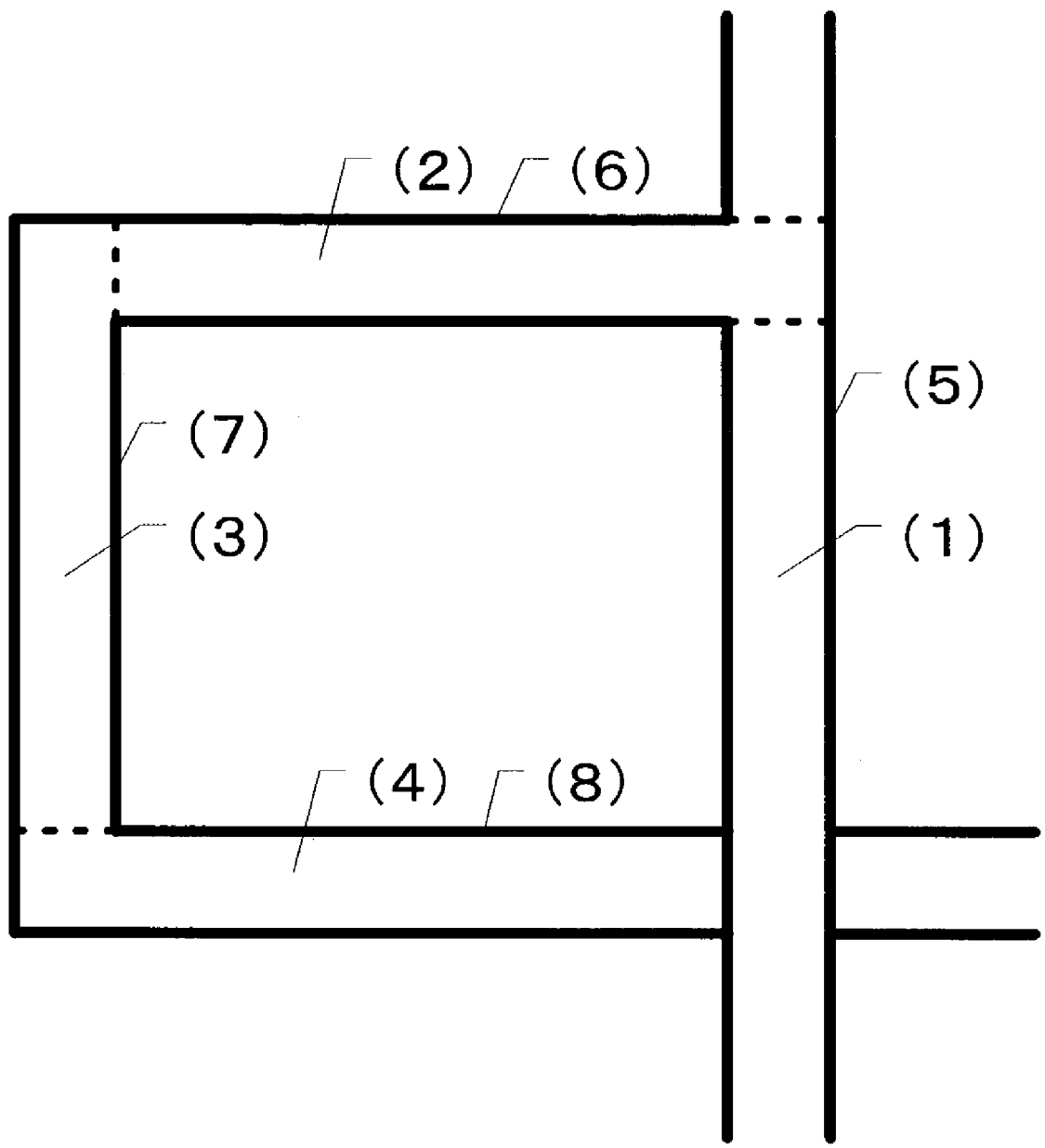
FIG. 14 is a diagram illustrating order of drawing the graphics shown in FIG. 13.
Figure 15:
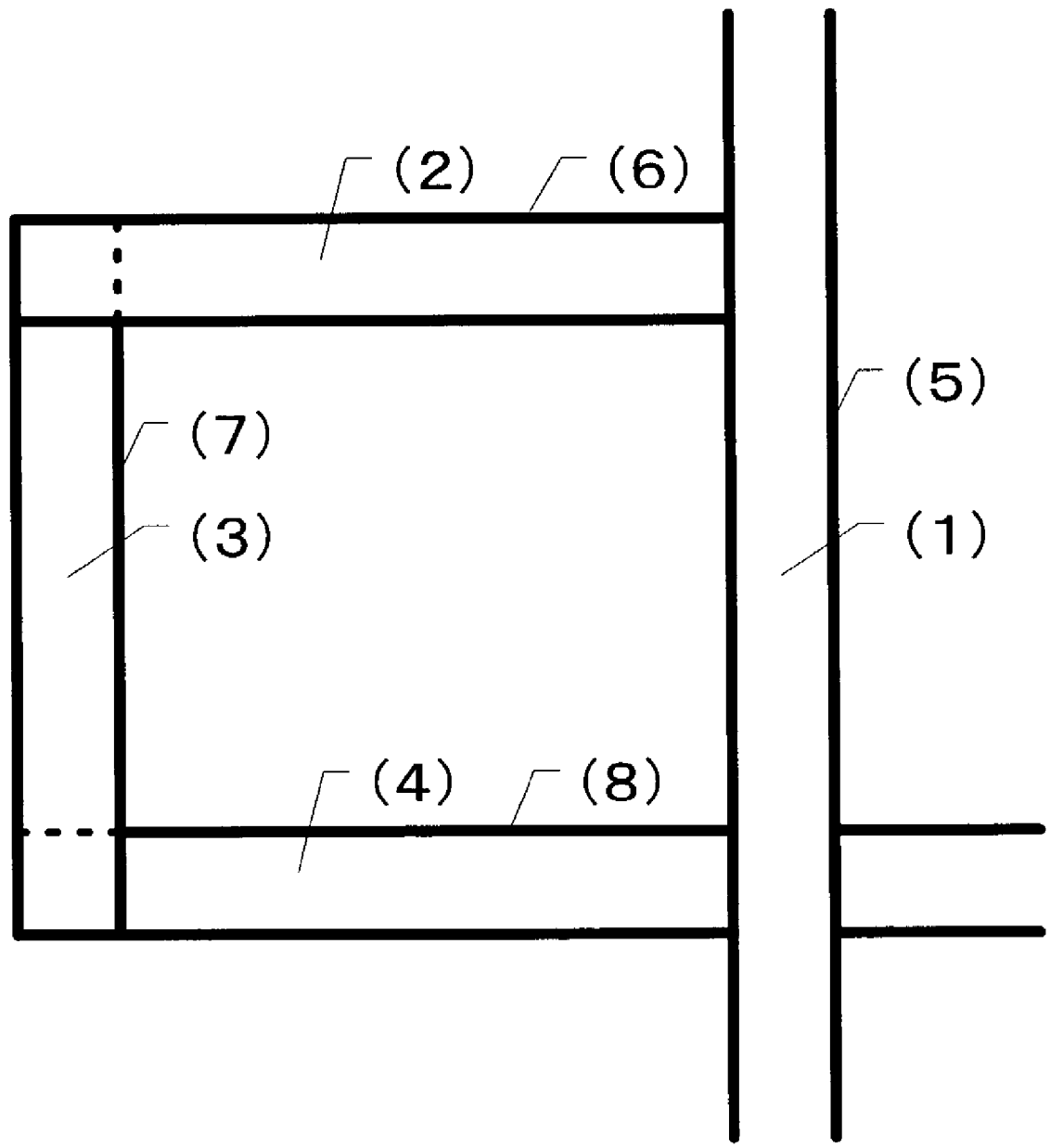
FIG. 15 is a diagram showing an image obtained in the case where the graphics are drawn in different order from the one illustrated in FIG. 14.

FIG. 9 illustrates, for the purpose of comparison, examples of what information is transferred from the CPU 20 to the graphics drawing device 21 according to conventional methods and the present invention when part of the graphics shown in FIG. 14 are to be drawn. In the first example of data transfer (conventional method) shown in FIG. 9, draw commands (line segment draw commands) for both of the main and derivative primitives and the coordinates of the start and end points of both the main and derivative primitives are input. In the second example of data transfer (conventional method), on the other hand, the start/end point coordinates are input only for the main primitive and the input of the start/end point coordinates of the derivative primitive is omitted. Thus, compared with the first example of data transfer, the amount of data to be transferred is reduced.

According to the present invention, the draw commands for the main and derivative primitives are unified, whereby the amount of data can be reduced further by an amount corresponding to one line segment draw command. Moreover, according to the second embodiment, the attribute information of the primitives can also be omitted, though not illustrated in FIG. 9.

In the above description, the start and end points of line segments are input as the drawing data, but in cases where the same coordinates as those of the graphic drawn immediately before can be used, part of the drawing data may be omitted. For example, where a line segment having the start point (X2, Y2, Z0) and the end point (X3, Y3, Z0) is to be drawn after a line segment having the start point (X1, Y1, Z0) and the end point (X2, Y2, Z0) is drawn, a command specifying that the new line segment should start from the end point of the previously drawn line segment may be input as the draw command. Since, in this case, the input of the start-point coordinates of the new line segment can be omitted, it is possible to further reduce the amount of information transferred between the CPU 20 and the graphics drawing device 21.

Alternatively, the start-point coordinates alone may be updated by overwriting such that the new line segment has the start point (X3, Y3, Z0) and the end point (X2, Y2, Z0).

A third embodiment of the present invention will be now described.

Figure 10:
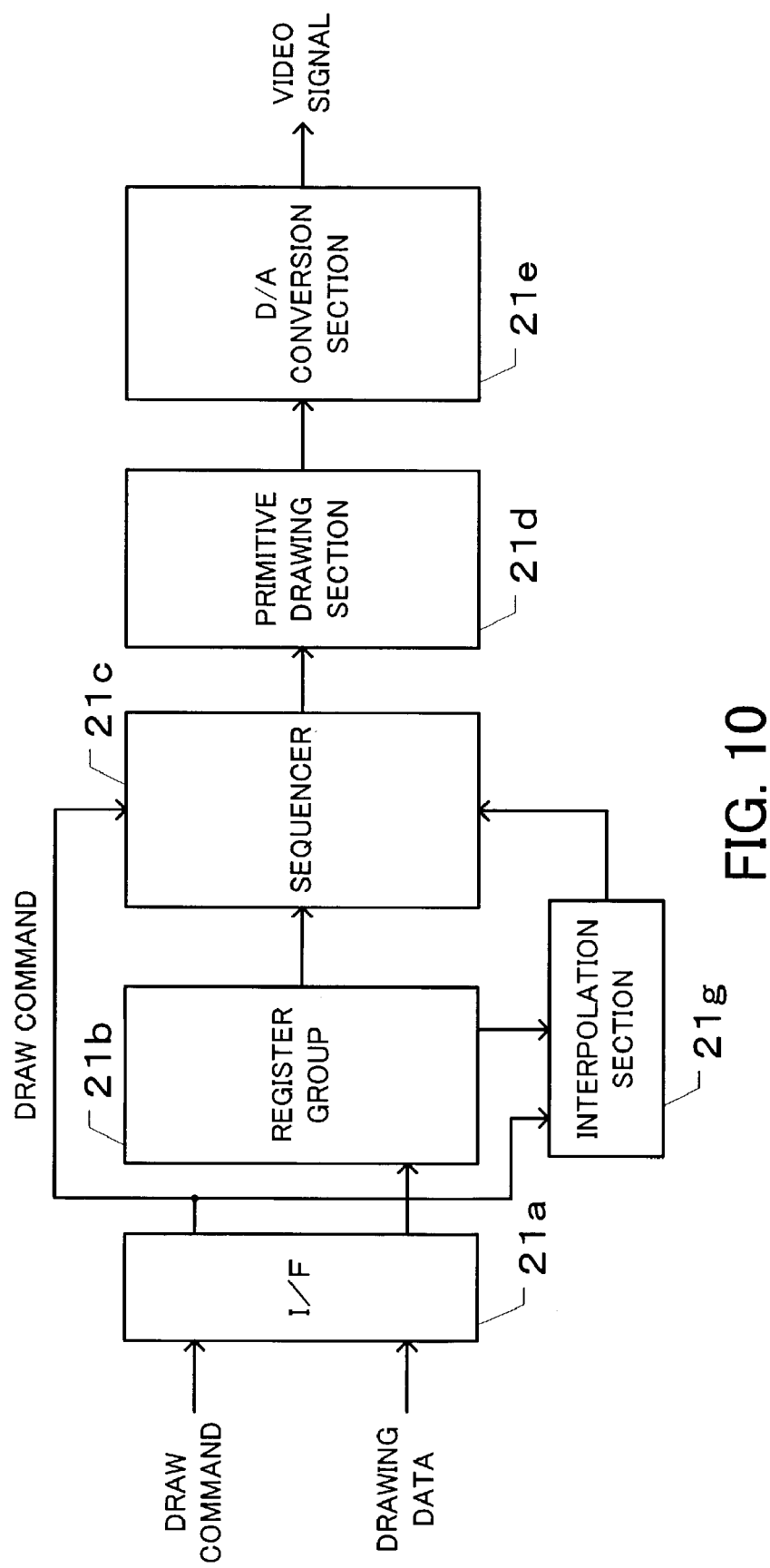
FIG. 10 is a diagram illustrating an exemplary configuration according to a third embodiment of the present invention.

FIG. 10 illustrates an exemplary configuration according to the third embodiment of the present invention. In FIG. 10, identical reference numerals are used to denote elements corresponding to those appearing in FIG. 4, and description of such elements is omitted.

Compared with the embodiment shown in FIG. 4, the third embodiment is additionally provided with an interpolation section 21g. In other respects, the third embodiment is configured in the same manner as the embodiment shown in FIG. 4.

When interpolation is enabled, the interpolation section 21g looks up the information stored in the register group 21b to generate a graphic for interpolating primitives, and causes the sequencer 21c to draw the generated graphic.

Operation according to this embodiment will be now described.

Figure 11C:
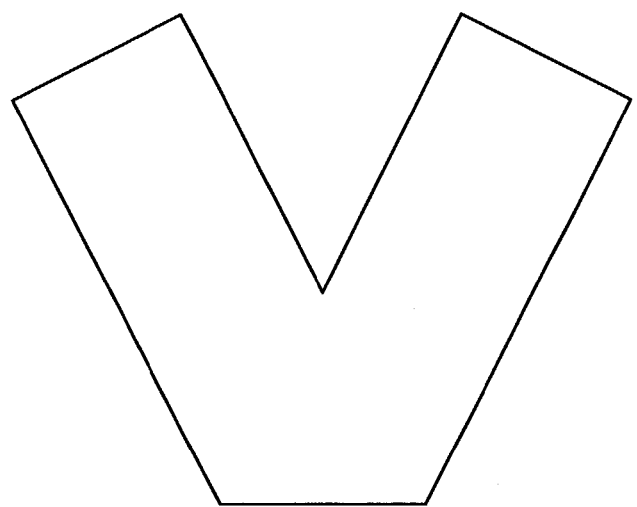
FIGS. 11(A), 11(B) and 11(C) are diagrams illustrating an example of a process executed by the embodiment shown in FIG. 10.
Figure 11B:
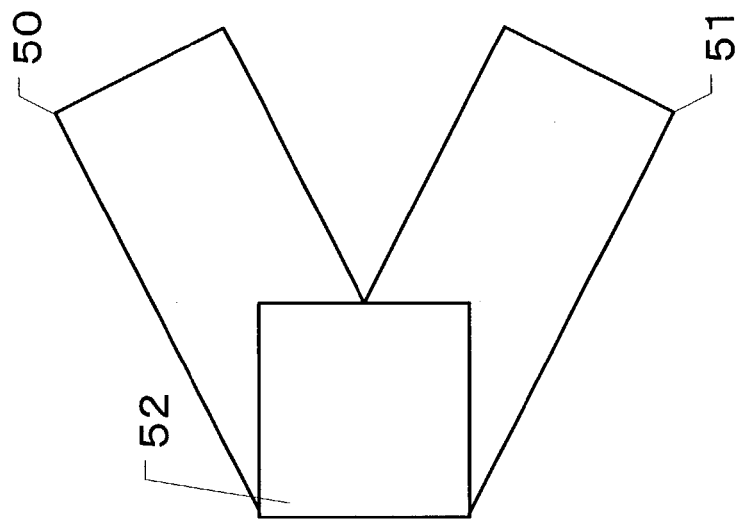
Figure 11A:
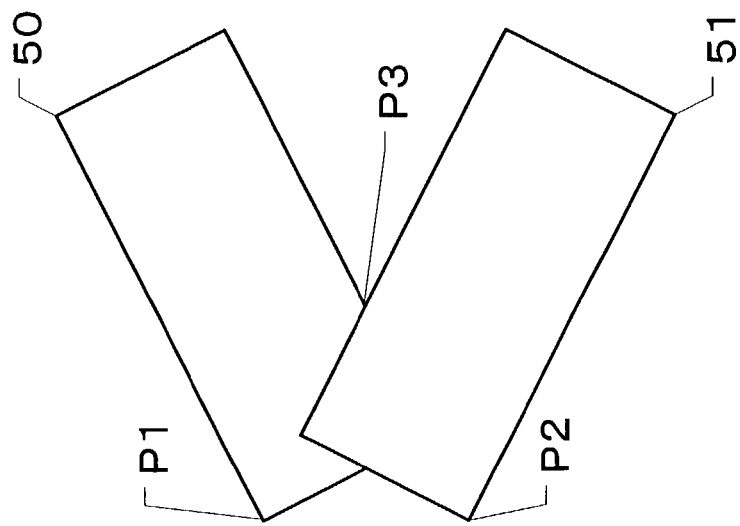

In the case where a draw command requesting drawing of two overlapping line segments shown in FIG. 11(A), for example, and drawing data are input to the graphics drawing device 21 from the CPU 20, the draw command is supplied to the sequencer 21c and the interpolation section 21g. The drawing data is stored in the register group 21b. It is assumed that the draw command input at this time has set therein information enabling the interpolation.

Thereupon, the interpolation section 21g looks up the draw command received through the I/F 21a and recognizes that the interpolation is enabled.

On the other hand, after information is set in the register group 21b, the sequencer 21c looks up the set information and requests the primitive drawing section 21d to draw line segments 50 and 51 shown in FIG. 11(A). As a result, the line segments 50 and 51 are drawn as shown in FIG. 11(A).

Subsequently, the interpolation section 21g generates a draw command and drawing data for drawing a rectangle 52 which has vertexes P1 and P2 where the line segments do not overlap and which also has a side passing through a point P3 where the line segments meet, and supplies the generated information to the sequencer 21c.

In accordance with the draw command and drawing data supplied from the interpolation section 21g, the sequencer 21c draws the rectangle 52. At this time, the interpolation section 21g carries out depth management such that the depth coordinate of the rectangle 52 is set equal to that of the line segment 51, for example, whereby the line segments 50 and 51 can be interpolated naturally by means of the rectangle 52, as shown in FIG. 11(C).

Figure 12:
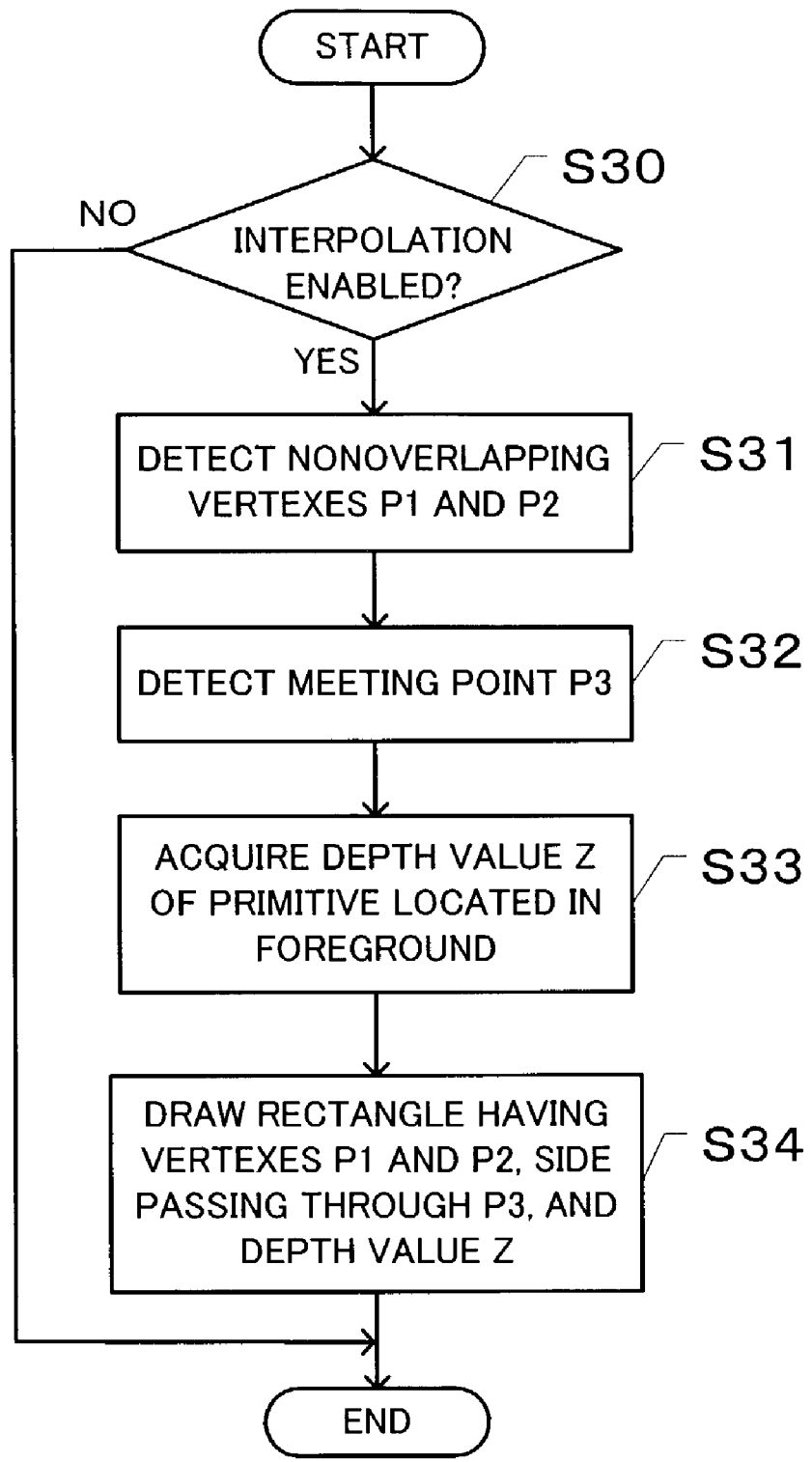
FIG. 12 is a flowchart illustrating an exemplary procedure for carrying out the process shown in FIG. 11.

FIG. 12 is a flowchart illustrating an example of a process executed by the interpolation section 21g. Upon start of the process shown in the flowchart, the following steps are executed.

Step S30:

The interpolation section 21g looks up the draw command to determine whether or not the interpolation is enabled. If the interpolation is enabled, the flow proceeds to Step S31; if not, the process is ended.

Step S31:

The interpolation section 21g detects coordinates of the vertexes P1 and P2 where the two line segments to be interpolated do not overlap.

Step S32:

The interpolation section 21g detects coordinates of the point P3 where the two line segments to be interpolated meet along their length.

Step S33:

The interpolation section 21g acquires the depth value Z of the primitive which is located in the foreground. In the example shown in FIG. 11, the depth value of the line segment 51 is acquired.

Step S34:

The interpolation section 21g requests the primitive drawing section 21d to draw a rectangle which has vertexes coinciding with P1 and P2, a side passing through P3, and a depth value equal to Z.

In the above embodiment, a rectangle is used to interpolate the space between the line segments, but it is also possible to use a triangle or a circle for such interpolation. For example, the line segments may be interpolated by means of a triangle having its vertexes coinciding with points P1 and P2 and with the point where the line segments meet along their width. Alternatively, the line segments may be interpolated by means of a circle having points P1, P2 and P3 located on its circumference, for example.

Also, in the above embodiment, the interpolation of line segments is explained by way of example. Needless to say, the interpolation process can be applied to other geometric figures than line segments.

As described above, according to the first and second embodiments of the present invention, the amount of data transferred from the CPU 20 to the graphics drawing device 21 can be reduced, as compared with the conventional techniques.

Also, in the first and second embodiments of the present invention, the depth management is available, so that graphics can be drawn in desired order, making it unnecessary for the CPU 20 to manage the drawing order. Further, the drawing performance can advantageously be improved by suitably setting the drawing order. For example, in the case where primitives are drawn from the foreground toward the background, the overlapping parts of the second and succeeding primitives need not be drawn. Thus, the drawing of the overlapping parts can be omitted, and in consequence, the drawing speed can be improved.

In the first embodiment of the present invention, the graphics drawing device 21 automatically determines the drawing order. Accordingly, the drawing process can be speeded up and the load on the CPU 20 can be lightened.

In the second embodiment of the present invention, the draw commands for main and derivative primitives can be unified, so that the number of draw commands can be decreased, making it possible to further reduce the amount of data transferred from the CPU 20 to the graphics drawing device 21.

In the third embodiment of the present invention, the graphics drawing device 21 automatically performs the interpolation process as well as the depth management. It is therefore possible to naturally represent connections, without taking the drawing order into account.

The graphics drawing device described in the foregoing embodiments may be implemented by a semiconductor device. In this case, the various functions explained with reference to the above embodiments may be incorporated as needed into the semiconductor device.

As described above, according to the present invention, a graphics drawing device for drawing graphics is provided which comprises a first storage circuit for storing coordinate information and attribute information about a main graphic which is an original graphic, a second storage circuit for storing coordinate information and attribute information about one or two or more derivative graphics derived from the main graphic, a drawing circuit for drawing the main and derivative graphics in accordance with the information stored in the first and second storage circuits, and a control circuit for controlling a drawing process performed by the drawing circuit. Accordingly, in cases where the coordinate or attribute information of a graphic to be drawn is identical with that of the main or derivative graphic which was drawn immediately before, the transfer of such information from the CPU can be omitted, whereby the amount of data transferred from the CPU to the graphics drawing device can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A graphics drawing device for drawing graphics, comprising:
   a first storage circuit for storing coordinate information and attribute information about a main graphic which is an original graphic;
   a second storage circuit for storing coordinate information and attribute information about one or two or more derivative graphics derived from the main graphic;
   a drawing circuit for drawing the main and derivative graphics in accordance with the information stored in said first and second storage circuits such that information common to the main and the derivative graphics is omitted and information differing between the main and the derivative graphics is drawn; and
   a control circuit for controlling a drawing process performed by said drawing circuit.

2. The graphics drawing device according to claim 1, wherein, if there is coordinate information or attribute information common to a main or derivative graphic drawn immediately before and a next graphic to be drawn next, said first and second storage circuits use the common information to draw the next graphic, without discarding the common information.

3. The graphics drawing device according to claim 1, further comprising a command analyzer circuit for analyzing a draw command supplied thereto from outside, generating the coordinate or attribute information about the main or derivative graphic, and storing the generated information in said first or second storage circuit.

4. The graphics drawing device according to claim 1, wherein, if there is coordinate information or attribute information common to the main and derivative graphics, the common information of one of the main and derivative graphics alone is stored while the common information of another main and derivative graphics is omitted.

5. The graphics drawing device according to claim 1, wherein the coordinate information of the derivative graphic is generated by adding an offset value to the coordinate information of the main graphic.

6. The graphics drawing device according to claim 1, wherein the coordinate information of the derivative graphic is generated by scaling the coordinate information of the main graphic.

7. The graphics drawing device according to claim 1, wherein the attribute information includes information specifying whether the main or derivative graphic with which the attribute information is associated should be drawn or not, and
said control circuit looks up the attribute information and keeps the main or derivative graphic from being drawn if the attribute information specifies that the main or derivative graphic should not be drawn.

8. The graphics drawing device according to claim 1, wherein the coordinate information includes information about a depth direction of an image, and
said control circuit looks up the information about the depth direction and controls said drawing circuit such that the main and derivative graphics are correctly located along the depth direction.

9. The graphics drawing device according to claim 1, wherein said control circuit looks up the attribute information to automatically set an order of drawing the main and derivative graphics.

10. The graphics drawing device according to claim 9, wherein, if a blending process needs to be performed, said control circuit controls the drawing order such that the main and derivative graphics are drawn from background toward foreground.

11. The graphics drawing device according to claim 9, wherein, if the drawing process needs to be speeded up, said control circuit controls the drawing order such that the main and derivative graphics are drawn from foreground toward background.

12. The graphics drawing device according to claim 1, further comprising an interpolative graphic generation circuit for generating and affixing an interpolative graphic to a region where the main graphics or the derivative graphics are to be connected to each other, and
wherein said interpolative graphic generation circuit looks up information about depth direction of the graphics to be connected, to generate the interpolative graphic.

13. A semiconductor device for drawing graphics, comprising:
a first storage circuit for storing coordinate information and attribute information about a main graphic which is an original graphic;
a second storage circuit for storing coordinate information and attribute information about one or two or more derivative graphics derived from the main graphic;
a drawing circuit for drawing the main and derivative graphics in accordance with the information stored in said first and second storage circuits such that information common to the main and the derivative graphics is omitted and information differing between the main and the derivative graphics is drawn; and
a control circuit for controlling a drawing process performed by said drawing circuit.

14. The semiconductor device according to claim 13, wherein, if there is coordinate information or attribute information common to a main or derivative graphic drawn immediately before and a next graphic to be drawn next, said first and second storage circuits use the common information to draw the next graphic, without discarding the common information.

15. The semiconductor device according to claim 13, further comprising a command analyzer circuit for analyzing a draw command supplied thereto from outside, generating the coordinate or attribute information about the main or derivative graphic, and storing the generated information in said first or second storage circuit.

16. The semiconductor device according to claim 13, wherein, if there is coordinate information or attribute information common to the main and derivative graphics, the common information of one of the main and derivative graphics alone is stored while the common information of another main and derivative graphics is omitted.

17. The semiconductor device according to claim 13, wherein the attribute information includes information specifying whether the main or derivative graphic with which the attribute information is associated should be drawn or not, and
said control circuit looks up the attribute information and keeps the main or derivative graphic from being drawn if the attribute information specifies that the main or derivative graphic should not be drawn.

18. The semiconductor device according to claim 13, wherein the coordinate information includes information about a depth direction of an image, and
said control circuit looks up the information about the depth direction and controls said drawing circuit such that the main and derivative graphics are correctly located along the depth direction.

19. The semiconductor device according to claim 13, wherein said control circuit looks up the attribute information to automatically set an order of drawing the main and derivative graphics.

20. The semiconductor device according to claim 13, further comprising an interpolative graphic generation circuit for generating and affixing an interpolative graphic to a region where the main graphics or the derivative graphics are to be connected to each other, and
wherein said interpolative graphic generation circuit looks up information about depth direction of the graphics to be connected, to generate the interpolative graphic.

21. A method for drawing graphics, comprising:
storing coordinate information and attribute information about a main graphic which is an original graphic;

storing coordinate information and attribute information about one or two or more derivative graphics derived from the main graphic; and drawing the main and derivative graphics in accordance with the information stored such that information common to the main and the derivative graphics is omitted and information differing between the main and the derivative graphics is drawn.

* * * * *

UNITED STATES PATENT AND TRADEMARK OFFICE
CERTIFICATE OF CORRECTION

| | |
|---|---|
| PATENT NO. | : 6,961,059 B2 |
| APPLICATION NO. | : 10/375014 |
| DATED | : November 1, 2005 |
| INVENTOR(S) | : Makoto Nakahara |

It is certified that error appears in the above-identified patent and that said Letters Patent is hereby corrected as shown below:

Column 15, line 18, after "while" delete "the".
Column 16, line 34, after "while" delete "the".

Signed and Sealed this

Twenty-fifth Day of July, 2006

JON W. DUDAS
*Director of the United States Patent and Trademark Office*